United States Patent [19]
Schoettle

[11] Patent Number: 5,335,130
[45] Date of Patent: Aug. 2, 1994

[54] CASSETTE WITH RECORDING MEDIUM

[75] Inventor: Klaus Schoettle, Heidelberg, Fed. Rep. of Germany

[73] Assignee: BASF Aktiengesellschaft, Ludwigshafen, Fed. Rep. of Germany

[21] Appl. No.: 10,056

[22] Filed: Jan. 28, 1993

[30] Foreign Application Priority Data

Jan. 29, 1992 [DE] Fed. Rep. of Germany ....... 4202334

[51] Int. Cl.⁵ .......................................... G11B 23/087
[52] U.S. Cl. ................................................... 360/132
[58] Field of Search ............... 360/132, 133; 242/199; 369/291

[56] References Cited

U.S. PATENT DOCUMENTS 4,618,903 10/1986 Oishi et al. .......................... 360/132
5,214,554 5/1993 Vollmann et al. .................. 360/132

FOREIGN PATENT DOCUMENTS 406943 1/1991 European Pat. Off. .

Primary Examiner—Robert S. Tupper
Attorney, Agent, or Firm—Keil & Weinkauf

[57] ABSTRACT

A cassette having a movable closure member for housing openings and a spring in a housing recess between housing and closure member is designed with a spring having an effective thickness with respect to the housing recess receiving the spring, such that the closure member is kept at a predetermined constant distance from the housing surface.

7 Claims, 3 Drawing Sheets

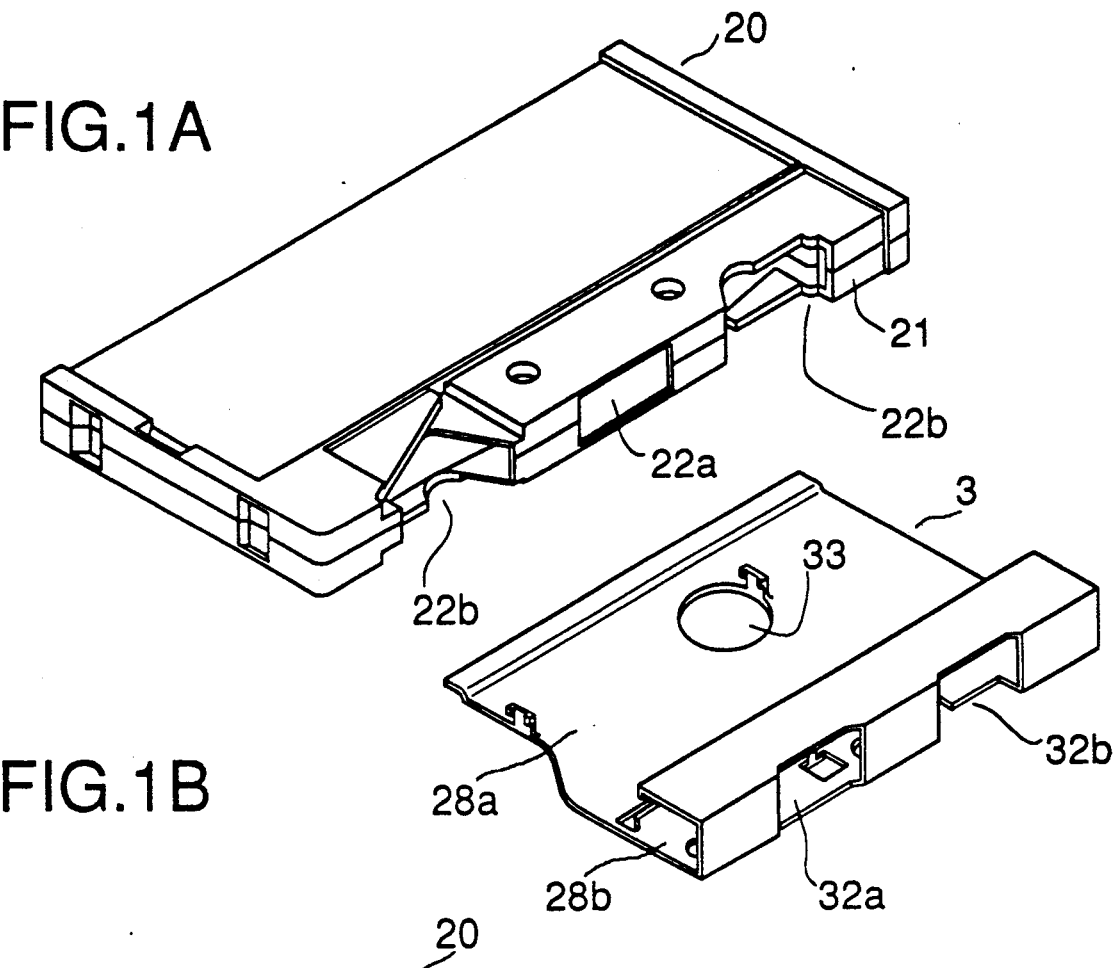
FIG.1A
FIG.1B
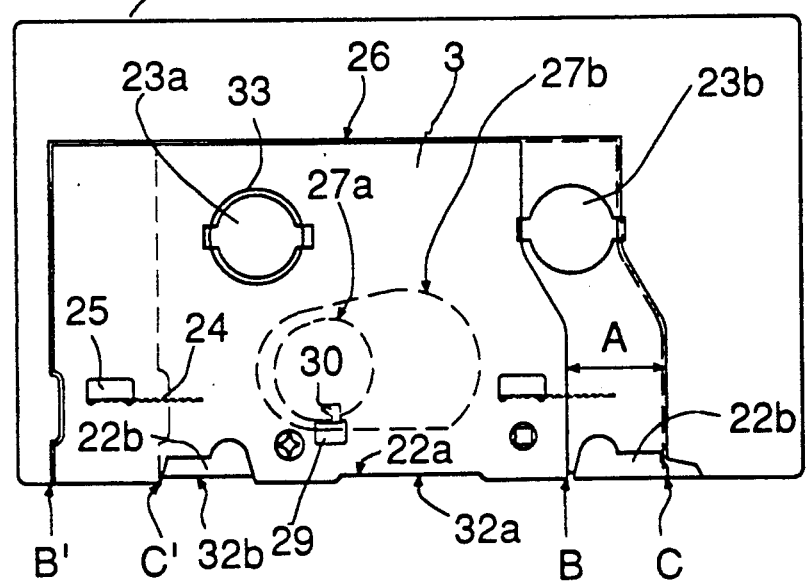
FIG.2

FIG.3
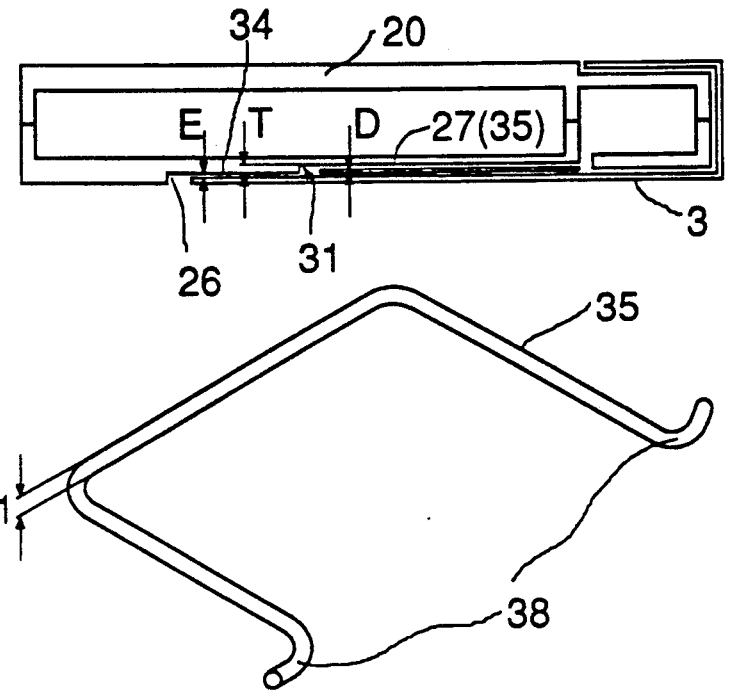
FIG.3A
FIG.4
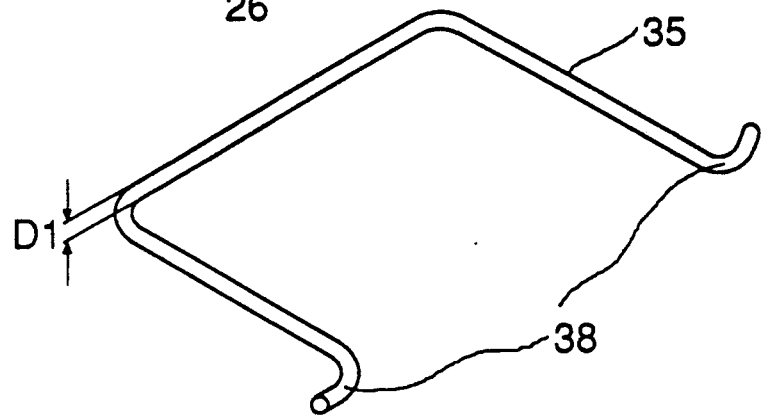
FIG.4A
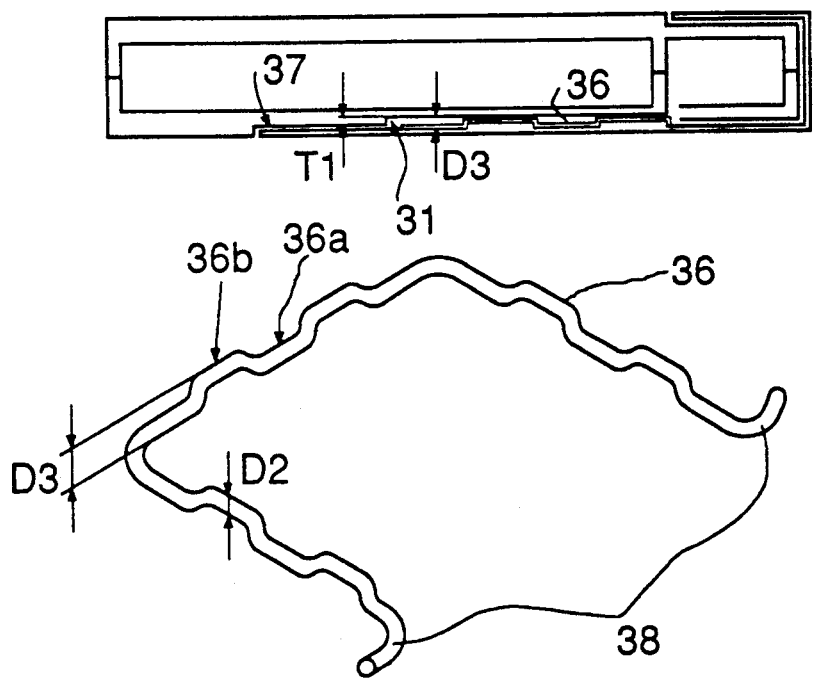

CASSETTE WITH RECORDING MEDIUM

BACKGROUND OF THE INVENTION

1. Field of the Invention

The invention relates to a cassette with recording medium, in particular a magnetic tape cassette, having a housing and first openings therein for the entry of drive members on the recorder and second openings for access to the recording medium, and having a movable closure member and a spring for closing and exposing the first and second openings, the closure member being fastened by means of the spring movably on the housing and at least the spring being provided in a housing recess.

2. Description of the Related Art

Such a cassette is known from EP-A-406 943. (U.S. Pat. No. 5,214,554) The closure part described and represented therein is in practice produced from very thin, approximately 0.1 to 0.4 mm thick stainless steel. Its shape is formed in practice by punching or wire erosion and bending. In these customary production operations, unavoidable sharp edges occur. Since the closure part performs a displacing movement over the housing surface, even the slightest unevennesses result in the housing material being scraped off. Apart from the ugly scraping marks produced, which are very detrimental for the attractiveness of the product, the scraping particles cause malfunctions, which are in most cases permanent, in analog or digital recording/playback owing to impressions in the magnetic tape and/or impairments in tape/head contact.

The present invention aims to avoid from the outset such disadvantages in the case of cassettes having a closure member.

SUMMARY OF THE INVENTION

With the cassette with recording medium, in particular a magnetic tape cassette, having a housing and first openings located therein for the entry of drive members on the recorder and second openings for access to the recording medium and having a movable closure member and a spring for closing and exposing the first and second openings, the closure member being fastened by means of the spring movably on the housing and at least the spring being provided in a housing recess, the object is achieved according to the invention if the spring has an effective thickness which is greater than the depth of the housing recess.

This advantageously achieves the effect that the closure member is kept at a defined constant distance from the outside of the cassette housing and consequently damage due to scratching of the surface and malfunctions due to jamming or sticking of the closure member are avoided. What is meant in this case by the effective thickness of the spring is the greatest distance in each case between the lowermost contact point of the spring (on the bottom of the recess) and the highest contact point (with the closure member).

In a practical design embodiment, the spring can consist of round steel wire, as a result of which the contact area with the bottom of the recess is already reduced considerably.

The spring may in another practical embodiment also be permanently deformed along its length in its vertical direction for example in meander shape or wave shape, so that by these deformations alone the contact areas are reduced, irrespective of the cross section of the spring wire material. Moreover, the effective thickness of the spring can be increased beyond the thickness of the spring wire.

It is favorable furthermore for expedient assembly if the spring has in the horizontal direction (plan view) the shape of a U, the shape of a circle segment or the shape of a triangle.

The spring itself is likewise a subject of the invention.

BRIEF DESCRIPTION OF THE DRAWINGS

The invention is described and represented by means of illustrative embodiments in the drawing, in which:

FIG. 1A shows a magnetic tape cassette housing,

FIG. 1B shows an associated closure part,

FIG. 2 shows the housing rear side with various closure part positions,

FIG. 3 shows a diagrammatic cross-sectional view of the housing with closure part according to FIG. 2, FIG. 3A shows a spring shape perspectively, FIG. 4 shows a further diagrammatic cross-sectional view with a further version of the spring, FIG. 4A shows the version of the spring from FIG. 4 perspectively.

DESCRIPTION OF THE PREFERRED EMBODIMENTS

Figure 5:
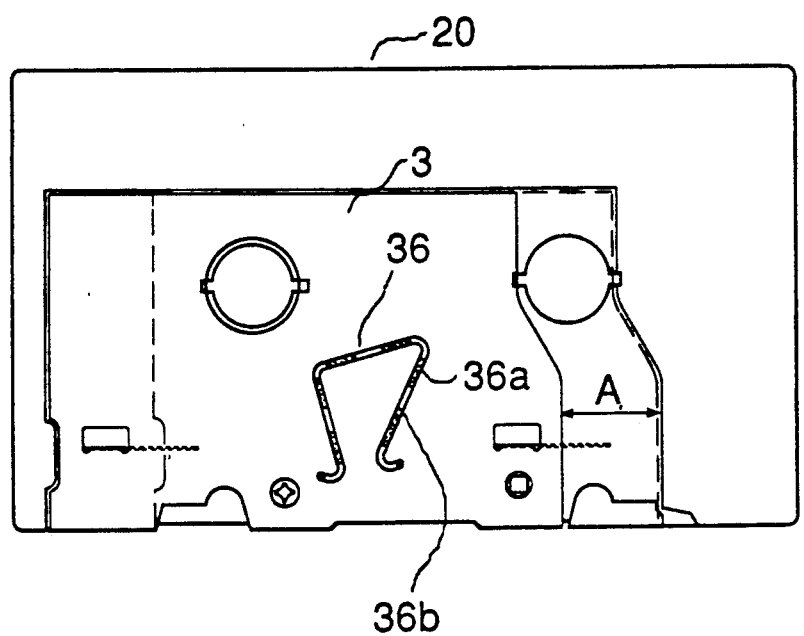
FIG. 5 shows a housing rear side according to FIG. 2 with a version of the spring according to FIG. 4 and FIG. 4A.

The housing 20 of the cassette is covered on its front side 21 with the front openings 22A and 22B by means of the closure part 3, the openings 22A and 22B being either closed or exposed, depending on the position of the displaceable closure part, as can be seen in detail in FIG. 2. The drive openings for the tape rolls or reels, in coplanar arrangement but not visible, are denoted by 23a and 23b. From such a cassette, the tape is, for example, drawn out for R/P operation; however, it may in this case also remain in the cassette. The closure part 3 is displaceable in the directions of the double-headed arrow A (FIG. 2), both the drive openings 23a and 23b and the front openings 22a and 22b being closed in the position C'—C and open in the position B'—B.

The displaceability of the closure part 3 is permitted by guides, the grooves 24 in the housing 20 and the runners 25 engaging therein on the closure part 3 itself. From the position B' to the position C there extends around the drive openings 23a and 23b the contour line of the recess 26 in the housing 20, in which the closure part 3 can move. The movement into the closure position C'—C is performed by means of pretension of the spring 27, which assumes with 27a its extended form in the position C'—C and at 27b assumes the pretensioned, non-extended form in the exposure position B'—B.

The closure part 3 is formed by a bottom plate 28 and a U-shaped front part 29, the parts 28 and 29 being produced in one piece. The U-shaped front part 29 has front openings 32a and 32b and the bottom plate 28 has a through-opening 33, the front openings 32a and 32b of the closure part 3 being aligned with the front opening 22b on the right in FIG. 1A and the middle front opening 22a, and the through-opening 33 being directly over the drive opening 23a, in the exposure position B'—B, as a result of which the tape rolls or reels are accessible for driving purposes and the tape is accessible for recording/playback operation (R/P operation). With respect to the length of the front side, the length of the closure part 3 is so short that, in the exposure position B'—B, the drive openings 23b and the front opening 22b on the right in FIG. 1A are automatically free, that is they are no longer covered by the closure part 3.

The spring 27 is fastened between the closure part 3 by means of the shackle 29 on the one hand and the housing 20 by means of the shackle 30 on the other hand.

FIGS. 3 and 4 show housing 20 and closure part 3 diagrammatically in cross section. Here it becomes clear that, apart from the recess 26 of larger surface area for the closure part 3, there is also provided a recess 31 for the spring 27, sunk still further into said first recess. The depth of the recess 31 is denoted by T and the thickness of the spring 27 is denoted by D. According to the invention, as revealed by FIG. 3A, D>T, so that consequently the distance E between the bottom surface 34 of the recess 26 of larger surface area and the closure part 3 is greater than zero (E>0).

The spring in FIG. 3 may have in the horizontal position the same shape as the spring 27 from FIG. 2, but according to the invention it may also be designed approximately in the shape of a U, like the spring 35 in FIG. 3A. In FIG. 4, a spring 36 is represented in a manner corresponding to FIG. 3. The spring 36 is designed with parts of meander-shaped design deformed downward (36b) or upward (36a), which could also have a wave shape, for example sine wave, or a similar shape, in order to obtain a greater effective thickness D3 than D2, according to FIG. 4A. This embodiment is independent of the actual thickness D2 and the cross-sectional shape of the steel wire of the spring, only the height D3 of the deformations 36a, 36b playing a part as the effective thickness. As a result, the contact area between closure part 3 and housing recess surface 37 is reduced by the specific shaping in the vertical plane. FIG. 5 shows the spring 36 fitted into the cassette 20, the parts 36A being represented in black where there is contact with the closure part 3 and in white where there is no contact. The fastening of the springs 27, 35 and 36 is not represented in FIGS. 3 to 5, but may be performed by hooking the ends 38 behind corresponding shackles or into openings, as also described above.

For the depth T1 and the effective thickness D3 as well as the actual wire thickness D2, the relationship D2<D3>T1 applies.

The spring material is customary spring steel. The spring may be of any type, as long as the object set out according to the invention is achieved, which can also be accomplished, for example, by a narrow watch spring-like leaf spring.

The contact reduction in the horizontal plane can be favorably combined with the measure that the smallest surface of the spring body is in each case facing the outer surfaces of the housing.

In the example of FIG. 4, the housing wall is substantially thicker in the region of the spring recess 31 than in the example of FIG. 3, as a result of which the cassette housing gains stability.

A cassette having a movable closure member for housing openings and a spring between housing and closure member is designed with a spring having an effective thickness with respect to the housing recess receiving the spring, such that the closure element is kept at a predetermined constant distance from the housing surface.

We claim:

1. In a magnetic recording cassette having a housing with openings therein for the entry of drive members and for the access of scanning members to the recording medium, said housing having a movable closure member biased by a spring element for closing and exposing said openings, said spring element having an effective thickness and being housed in a recess on the housing between said housing and said movable closure member, said recess having a certain depth, the improvement comprising: the effective thickness of said spring element being greater than the certain depth of said recess, for preventing the closure member from scraping against the cassette housing.

2. A magnetic recording cassette as claimed in claim 1, wherein the spring consists of round steel wire.

3. A magnetic recording cassette as claimed in claim 1, wherein the spring consists of a steel wire having a thickness and having a permanent deformation along its length perpendicular to its horizontal extent, said deformation increasing the effective thickness of the spring beyond the thickness of the steel wire.

4. A magnetic recording cassette as defined in claim 1, wherein the spring element includes areas of vertical deformation along its length perpendicular to its horizontal extent, thereby increasing the effective thickness of the spring element.

5. A magnetic recording cassette as claimed in claim 4, where the spring, viewed from the side when in place on the cassette housing lying flat, follows a sine wave pattern or square wave pattern or similar pattern of permanent vertical deformation, thereby increasing its effective thickness.

6. A magnetic recording cassette as defined in claim 1, wherein the spring element is "U" shaped.

7. A magnetic recording cassette as claimed in claim 1, wherein the spring has a a wave-shape deformation perpendicular to its horizontal extent.

* * * * *